United States Patent Office 3,707,584
Patented Dec. 26, 1972

3,707,584
PROCESS FOR PRODUCING WATER-DILUTABLE HEAT-HARDENABLE CROSS-LINKING CO-POLYMERS
Laszlo Tulacs, Hitzendorf, near Graz, Austria, assignor to Vianova Kunstharz Aktiengesellschaft, Johannesgasse, Austria
No Drawing. Filed July 17, 1970, Ser. No. 56,003
Claims priority, application Austria, July 29, 1969, A 7,288/69
Int. Cl. C08g 37/32
U.S. Cl. 260—851
6 Claims

ABSTRACT OF THE DISCLOSURE

A process for producing upon neutralization water-soluble cross-linking co-polymers is described characterized in that from 5 to 40 percent by weight of a water-soluble or water-insoluble partially or completely etherified aminoplast resin, 5 to 30 percent by weight of an alpha-beta ethylenically unsaturated carboxylic acid or its functional derivative carrying at least one free carboxyl group, and 30 to 90 percent by weight of other co-polymerizable compounds carrying no free carboxyl groups are blended and thereafter reacted to form a homogeneous resinous composition. The composition obtained has improved gloss, adhesion, and flexibility and is particularly suitable for electrodeposition.

---

This invention is directed to the manufacture of protective coatings. More particularly, this invention is concerned with a process for producing water dilutable, cross-linking co-polymers of alpha-beta ethylenically unsaturated carboxylic acids and other co-polymerizable monomers wherein the co-polymerization is carried out in the presence of an aminoplast resin. The process permits the simple production of co-polymers in which the hardening component is built-in in the polymer in a single working step.

The preparation of binding media for coating compositions from mixtures of water-soluble aminoplast resins with water-soluble ammonium or amine salts of co-polymers of vinyl or vinylidene compounds and alpha-beta ethylenically unsaturated carboxylic acids is known. However, such mixtures have the disadvantage that upon cross-linking of the components, reactions will occur not only between co-polymer and aminoplast resin, but also a self-condensation of the latter. During the stoving process the nitrogen base is set free and the undesired self-condensation is further enhanced by the acidic character thus prevailing, leading to incompatibility in the coating and, thus, to surface deficiencies of the stoved film. Further disadvantages of such two component systems upon electrodeposition arise due to the different migration velocity of the components. On the one hand, films with unsatisfactory properties will result; on the other hand, the bath composition will change. Furthermore, water-insoluble aminoplast resins cannot be used in such systems, resulting in a substantial restriction in the choice of raw materials.

Heat hardenable water-soluble binding agents which are obtained through subsequent reaction of co-polymers with water-soluble or water-insoluble aminoplast resins are also known. These binders, in addition to co-polymerization, undergo a self-condensation of the aminoplast resin due to the local concentration of the aminoplast resin in the admixture and due to the reduced reactivity of the carboxy groups of the high molecular weight co-polymer solution, thereby causing deficiencies as noted above. Electrodeposited coatings of such binders will yield films with unsatisfactory properties such as poor flow, receding of the film from the edges, and insufficient cross-linking upon stoving.

It is further known from French Pat. No. 1,541,004 to co-polymerize reaction products of N-substituted melamine derivatives (e.g., hexamethoxymethylmelamine) with (meth)acrylic, maleic or fumaric acid produced in the presence of solid state catalysts, with other polymerizable monomers. These co-polymers can be cross-linked without the addition of other cross-linking agents and are optionally dilutable with water upon neutralization with ammonia or organic bases. A disadvantage of these systems is the fact that first a polymerizable reaction product has to be made of the N-substituted melamine derivatives and an alpha-beta ethylenically unsaturated carboxylic acid. The process involves substantial technical difficulties since, on the one hand, the condensation can only be effected in the presence of inert, mostly aromatic solvents to a satisfactory extent, which solvents have to be removed before the further co-polymerization, especially if water-soluble products are desired. On the other hand, the solid state catalysts have to be filtered off.

The present invention is directed to a process for producing, upon neutralization, water-soluble cross-linking co-polymers which is characterized in that 5 to 40 percent by weight—preferably 25 to 35 percent by weight—of a partially or completely etherified water-soluble or water-insoluble aminoplast resin is reacted to form a homogeneous resin compound with 5 to 30 percent by weight of an alpha-beta ethylenically unsaturated carboxylic acid or functional derivative thereof as long as it carries at least one free carboxy group, and 30 to 90 percent by weight of other co-polymerizable compounds carrying no free carboxy groups. The process permits the simple preparation of such cross-linking co-polymers in one working step and prevents the undesired and harmful self-condensation of the aminoplast component due to favorable concentration conditions. Co-employment of catalysts is not necessary in this process. The polymerization is carried out in solution in the presence of the aminoplast component whereby a part of the alpha-beta ethylenically unsaturated carboxylic acid reacts with the aminoplast component.

More specifically, the process of the invention is carried out in the following manner:

Aminoplast component, monomers, solvents, and the usual polymerization initiators and chain stoppers are blended to provide a homogeneous mixture. The amount of carboxylic acids is chosen such that the acid number of the mixture is preferably at least 80 mg. KOH/g. before the reaction. A part of the blend is charged to a suitable reaction vessel and heated to 90–130° C. The remainder of the blend is added continuously, optionally under reflux. Additional initiator can be added and the reaction is brought to an end. After adjusting the desired solid content, the resin is neutralized with suitable bases and the binding agent is processed further in known manner to obtain pigmented or unpigmented water dilutable coating compositions.

For the process of the invention, the usual aminoplast resins are suitable which are prepared from an aldehyde, preferably formaldehyde and nitrogen containing compounds condensible with the former, i.e., unhardened resins or their oligomeric or monomeric precondensates. Such compounds are, for example, with mono- or polyhydric alcohols, preferably monoalcohols with 1–4 carbon atoms, partially or completely etherified polymethylol compounds of urea, thiourea, guanidine, dicyandiamide, and, prefrably, of diamino or triamino compounds of the 1,3,5-triazines such as melamine, formoguanamine, acetoguanamine, benzoguanamine, ammeline. It is evident that also substitution products and derivatives of the mentioned substances can be used.

Suitable alpha-beta ethylenically unsaturated carboxylic acids are: acrylic acid, methacrylic acid, crotonic acid, maleic acid, fumaric acid, itaconic acid, citraconic acid, mesaconic acid, aconitic acid, alone or as mixtures, as well as their functional derivatives with at least one free carboxy group, e.g., the partial esters or amides of unsaturated polymerizable di- or polycarboxylic acids.

Suitable polymerizable compounds without free carboxy groups are: alkyl and oxyalkyl esters of alpha-beta ethylenically unsaturated carboxylic acids such as methyl-, ethyl-, propyl-, butyl-, isopropyl(meth)acrylate, 2-ethylhexyl(meth)acrylate, lauryl(meth)acrylate, stearyl-(meth)-acrylate, 2 - hydroxyethyl(meth)acrylate, 3 - hydroxypropyl(meth)acrylate, 4 - hydroxybutyl(meth)acrylate, etc., as well as the carboxy-free derivatives of unsaturated di- or polycarboxylic acids, e.g., diethylmaleate, dibutylfumarate, etc. Other polymerizable vinyl or vinylidene compounds can also be used advantageously, e.g., styrol, alkyl styroles such as o-, m-, p-methylstyrol, alpha-methyl styrol, (meth)acrylnitril, (meth)acrylamide, and other polymerizable compounds, as long as they are mixable with the other essential components. Furthermore, halogen-substituted compounds of the above-mentioned classes can be used in all cases.

For neutralization the usual neutralizing agents can be used such as ammonia, inorganic bases, and organic nitrogen bases. Suitable organic solvents are the usual solvents which do not disturb the water solubility. Alcohols, glycolethers, glycolesters, and keto-alcohols are preferred. Subordinate proportions of water-intolerant aliphatic or aromatic solvents can be co-employed.

The co-polymers prepared according to the invention consist of a homogeneous resin body. It is surprising that according to the process the obtained products are much paler in color than those obtained by subsequent condensation of co-polymers with aminoplast resins. The products of the invention are suitable as binding agents for coating compositions and, due to their stability, are particularly useful for the continuous and orderly working of electrodeposition installations. The obtained coatings exhibit extraordinary uniformity of the surface, good gloss, excellent resistance to alkalies, and good mechanical properties such as hardness, flexibility, and adhesion. A further advantage of the copolymers of the invention is the possibility of obtaining extremely pale electrodeposited coatings, unexcelled up to now, with superior yellowing resistance.

Having described the invention in general terms, the following detailed examples will be set forth to illustrate preferred embodiments. These examples are not to be construed as limiting the scope of the invention. All parts are by weight.

EXAMPLE 1

| | Parts |
|---|---|
| Hexamethoxymethylmelamine | 180 |
| Acrylic acid | 85 |
| 2-ethylhexylacrylate | 186 |
| Ethylene glycol monobutylether | 149 |
| Dicumyl peroxide | 12 |
| Tert. dodecyl mercaptan | 36 | are mixed homogeneously and dissolved. One third of the blend is charged to a reaction vessel equipped with stirrer, thermometer, and reflux condensor, and heated to reflux temperature under an atmosphere of inert gas. The rest of the blend is added continuously over a period of four hours and the temperature held for a further six hours, during which period two separate additions of 3 parts dicumyl peroxide, dissolved in 30 parts ethylene glycol monobutyl ether, are added. The reaction is carried to a solid content of 75 percent. During the reaction the acid number will fall from 109 mgm. KOH/gm. to 80–85 mgm. KOH/gm. (calculated on solid content). The water-white polymer has a viscosity of 32″ DIN 53 211, 50 percent in ethylene glycol monobutyl ether, and is infinitely, dilutable with water, neutralized to a pH-value of 8–8.5 with di-isopropanol amine.

Electrophoretic deposition

For electrophoretic deposition a paint is prepared as follows: 135 parts resin solution as prepared above, 75 percent non-volatile and 50 parts $TiO_2$, Rutile, are ground to a paint paste on a three roll mill. The paste is neutralized with 30 parts of 50 percent aqueous solution of di-isopropanol amine, and diluted to 10 percent solid content with distilled water. After 24 hours, coatings of this paint are deposited electrophoretically on zinc phosphated steel. The coats, stoved 30 minutes at 160° C. have a film thickness of 18–22 microns and are white, hard, flexible, and have an excellent surface.

Further test results are compiled in Table I.

To demonstrate the improvement in the coating composition of Example 1, coatings using prior art processes were prepared as set forth in Examples 2 and 3 hereinafter.

EXAMPLE 2

| | Parts |
|---|---|
| Acrylic acid | 85 |
| 2-ethylhexylacrylate | 186 |
| Vinyl toluol | 149 |
| Ethylene glycol monobutyl ether | 162 |
| Dicumyl peroxide | 12 |
| Tert. dodecylmerkaptane | 36 | are mixed and polymerized to a solid content of 66 percent analogous to Example 1. The polymer has a yellow color after cooling to 25–30° C. Thereafter, 180 parts hexamethoxymethylmelamine are added. The blend has a solid content of 73.6 percent and an acid number of 108 mgm. KOH/gm. The viscosity, 50 percent in ethylene glycol monobutyl ether, is 30″ DIN 53 211. The blend is neutralized with diisopropanol amine and will yield a clear solution upon dilution with water to a solid content of 10 percent and at a pH-value of 8.9.

Coatings are prepared analogous to Example 1. The films are substantially more soft than those of Example 1, have insufficient hiding power, and recede from the edges of the test panels.

EXAMPLE 3

| | Parts |
|---|---|
| Acrylic acid | 85 |
| 2-ethylhexylacrylate | 186 |
| Vinyl toluol | 149 |
| Ethylene glycol monobutyl ether | 162 |
| Dicumyl peroxide | 12 |
| Tert. dodecylmerkaptane | 36 | are mixed and analogous to Example 1 are polymerized to a solid content of 66 percent. Then 180 parts hexamethoxymethylmelamine are added and reacted for 3 hours at 110–115° C. The dark yellow product has a solid content of 77.6 percent and an acid number of 90 mgm. KOH/gm. (calculated on solid content). The viscosity, 50 percent in ethylene glycol monobutyl ether, is 50″ DIN 53 211.

Coatings prepared analogous to Example 1 exhibit properties similar to those of Example 2.

To further illustrate the present invention, preparations were carried out as follows:

EXAMPLE 4

| | Parts |
|---|---|
| Water-insoluble melamine resin, etherified with butanol, 80% in butanol, containing an average of 4.5 mols butanol and 5.5 mols formaldehyde per each mol of melamine | 37.5 |
| Acrylic acid | 5 |
| Methacrylic acid | 10 |
| Butyl acrylate | 31 |

EXAMPLE 4—Continued

| | Parts |
|---|---|
| Styrol | 24 |
| Ethylene glycol monobutyl ether | 27 |
| Dicumyl peroxide | 2 |
| Tert. dodecylmerkaptane | 6 | are mixed and polymerized to a solid content of 70 percent analogous to Example 1. The pale product has an acid number of 85 mgm. KOH/gm. and a viscosity of 55" DIN 53 211, 50 percent in ethylene glycol monobutyl ether.

Electrodeposited films show good gloss, good adhesion, and flexibility.

EXAMPLE 5

| | Parts |
|---|---|
| Commonly available, water-tolerant, highly etherified melamine resin (with methanol and ethanol, about 1:1) | 30 |
| Acrylic acid | 14 |
| 2-ethylhexyl acrylate | 26 |
| Hydroxypropyl acrylate | 10 |
| Styrol | 20 |
| Ethylene glycol monobutyl ether | 27 |
| Dicumyl peroxide | 2 |
| Tert. dodecylmerkaptane | 6 | are polymerized analogous to Example 1 to a solid content of 75 percent. The pale resin has an acid number of 85 mgm. KOH/gm. and a viscosity of 95" DIN 53 211, 50 percent in ethylene glycol monobutyl ether.

Deposition and properties are analogous to Example 1.

EXAMPLE 6

| | Parts |
|---|---|
| Commonly available water-insoluble butylated benzoguanamine resin, 60% in butanol | 50 |
| Maleic acid | 3 |
| Monobutyl maleate | 20 |
| Ethyl acrylate | 22 |
| Hydroxy ethyl acrylate | 10 |
| Vinyl toluol | 15 |
| Ethylene glycol monobutyl ether | 27 |
| Dicumyl peroxide | 2 |
| Tert. dodecylmerkaptane | 6 | are polymerized to a solid content of 64 percent analogous to Example 1. The resin has an acid number of 85 mgm. KOH/gm. and a viscosity of 75" DIN 53 211.

The properties of the deposited films are substantially comparable to those of Example 1.

The coating compositions prepared from the co-polymers of the invention and prior art were tested under the following conditions:

(A) Resistance to chemicals (a) Resistance to alkalis.—The test panels were kept in 5 percent NaOH at 40° C. for 40 hours.

(b) Resistance to solvents.—Rubbing with a cotton pad soaked with the solvent.

Gasoline for 10 minutes
Xylol for 1 minute (c) Lipstick test.—Lipstick marks must be removable with a dry cloth after two hours, without leaving traces.

(B) Stability test for electrophoretic paints

The diluted paint bath (10% resin solid content) is stirred in an open container for 10 days at 40° C.

There should be no essential changes in the electric deposition properties of the bath and neither in the properties of the deposited and stoved films.

The test results for Examples 1–6 can be seen from Table I.

TABLE I

| | Resistance to chemicals | | | | Stability test, film properties |
|---|---|---|---|---|---|
| | 5% NaOH/40° C., 40 hr. | Gasoline super, 10 min. | Xylol, 1 min. | Lipstick, 2 hr. | |
| Example: | | | | | |
| 1 | No attack | 1.0 | 1.5 | 1.0 | Good. |
| 2[1] | Blisters, matt film, swollen. | 2.0 | 3.0 | 3.0 | Rough surface. |
| 3[1] | Matt film, swollen. | 1.5 | 2.0 | 2.0 | Structured surface. |
| 4 | Slightly matt | 1.0 | 1.5 | 1.5 | Good. |
| 5 | No attack | 1.0 | 1.5 | 1.0 | Do. |
| 6 | Slightly matt and slightly swollen. | 1.0 | 1.5 | 2.0 | Slightly structured surface. |

[1] Prior art process.
NOTE.—Evaluation: 1, Good or pass; 2, Slight attack; 3, Moderate attack; 4, Severe attack; 5, Film destroyed.

In Examples 7–9 various contents of aminoplast component are used. The results of the tests for these preparations—which tests are the same as those used for Examples 1–6—can be seen from Table II.

EXAMPLE 7

| | Parts |
|---|---|
| Commonly available water-tolerant melamine resin, highly etherified with methanol and ethanol (about 1:1), 100% | 20 |
| Acrylic acid | 5 |
| Methacrylic acid | 10 |
| Styrol | 32 |
| 2-ethylhexylacrylate | 33 |
| Ethylene glycol monobutyl ether | 27 |
| Dicumyl peroxide | 2 |
| Tert. dodecylmerkaptane | 6 | are mixed and polymerized analogous to Example 1 to a solid content of 75 percent. The resin has an acid number of 85 mgm. KOH/gm. and a viscosity of 75" DIN 53 211, 50 percent in ethylene glycol monobutyl ether.

EXAMPLE 8

| | Parts |
|---|---|
| A water-insoluble melamine resin, etherified with butanol, 80% in butanol, containing an average of 5.5 mols of formaldehyde and 4.5 mols of butanol per mol of melamine | 44 |
| Acrylic acid | 5 |
| Methacrylic acid | 10 |
| Styrol | 22 |
| 2-ethylhexyl acrylate | 28 |
| Ethylene glycol monobutyl ether | 27 |
| Dicumyl peroxide | 2 |
| Tert. dodecylmerkaptane | 6 | are mixed and analogous to Example 1 polymerized to a solid content of 70 percent. The resin has an acid number of 90 mgm. KOH/gm. and a viscosity of 60" DIN 53 211, 50 percent ethylene glycol monobutyl ether.

EXAMPLE 9

| | Parts |
|---|---|
| Melamine resin of Example 8 | 25 |
| Maleic acid monoamide | 5 |
| Methacrylic acid | 10 |
| Styrol | 32 |
| 2-ethylhexylacrylate | 33 |
| Ethylene glycol monobutyl ether | 27 |
| Dicumyl peroxide | 2 |
| Tert. dodecylmerkaptane | 6 | are mixed and polymerized to a solid content of 71 percent. The resin has an acid number of 72 mgm. KOH/gm. and a viscosity of 80" DIN 53 211, 50 percent in ethylene glycol monobutyl ether.

TABLE II

| | Resistance to chemicals | | |
|---|---|---|---|
| | 5% NaOH, 40 hours/40° C. | Xylol, 1 minute | Lipstick, 2 hours |
| Example: | | | |
| 7 | No attack | 1.5 | 1.5 |
| 8 | Matt film | 1.5 | 1.0 |
| 9 | No attack | 1.5 | 2.0 |

NOTE.—Evaluation: see Table I.

Other properties such as hardness, flexibility, and surface are comparable to those of Example 1.

Examples 10–12 illustrate the use of further raw materials for the process of the invention.

EXAMPLE 10

| | Parts |
|---|---|
| A water-insoluble butylated urea resin, containing an average of 1.9 mols of formaldehyde and 1.7 mols of butanol per mol of urea, 70% in butanol | 43 |
| Acrylic acid | 15 |
| Butyl acrylate | 31 |
| Styrol | 24 |
| Ethylene glycol monoethyl ether | 27 |
| Di-tert. butyl peroxide | 2 |
| Tert. dodecylmerkaptane | 6 | are mixed and polymerized to a solid content of 66 percent analogous to Example 1. The pale product has an acid number of 90 mgm. KOH/gm. and a viscosity of 41" DIN 53 211, 50 percent in ethylene glycol monoethyl ether.

EXAMPLE 11

| | Parts |
|---|---|
| A water-insoluble acetoguanamineresin, etherified with iso-butanol, containing an average of 1.8 mols of formaldehyde and 1.0 mols of iso-butanol per mol of acetoguanamine, 70% in butanol | 43 |
| Citraconic acid | 12 |
| Acrylamide | 10 |
| Diethyl maleate | 10 |
| Styrol | 5 |
| Isobutyl methacrylate | 33 |
| Ethylene glycol monobutyl ether | 27 |
| Dicumyl peroxide | 2 |
| Tert. dodecylmerkaptane | 6 | are mixed and polymerized to a solid content of 70 percent analogous to Example 1. The product has an acid number of 87 mgm. KOH/gm. and a viscosity of 32" DIN 53 211, 50 percent in ethylene glycol monobutyl ether.

EXAMPLE 12

| | Parts |
|---|---|
| Tetramethoxymethyldicyanidiamide, 70% in ethylene glycol monoethyl ether | 43 |
| Itaconic acid | 13 |
| Styrol | 20 |
| Acrylnitrile | 10 |
| Laurylmethacrylate | 27 |
| Ethylene glycol monoethyl ether | 17 |
| Di-tertiary butyl peroxide | 2 |
| Tert. dodecylmerkaptane | 6 | are mixed and polymerized to a solid content of 70 percent analogous to Example 1. The product has an acid number of 87 mgm. KOH/gm. and a viscosity of 32" DIN 53 211, 50 percent in ethylene glycol monoethyl ether.

Coating compositions prepared from the products of Examples 10–12 exhibited properties analogous to those of Example 1.

It should be appreciated that the present invention is not to be construed as being limited by the illustrative embodiments. It is possible to produce still other embodiments without departing from the inventive concept herein disclosed. Such embodiments are within the ability of one skilled in the art.

It is claimed:

1. Process for producing cross-linking co-polymers, water-soluble upon neutralization, from aminoplast resins, alpha-beta ethylenically unsaturated carboxylic acids and other co-polymerizable compounds, comprising the steps of (1) homogeneously blending in the unreacted state from about
    (a) 5–40 percent by weight of a water-soluble or water-insoluble, completely or partially etherified aminoplast resin;
    (b) 50–30 percent by weight of an alpha-beta ethylenically unsaturated carboxylic acid or its functional derivative, carrying at least one free carboxy group, alone or in mixture, and
    (c) 30–90 percent by weight of other co-polymerizable compounds carrying no free carboxy groups, and
(2) thereafter heating said homogeneous blend of (1) at a temperature of from about 90–130° C. to form a homogeneous resinous body.

2. Process according to claim 1 characterized in that the reaction is carried out at reflux temperatures.

3. Process according to claim 1 wherein said aminoplast resin is present at from 25 to 35 percent by weight.

4. Process according to claim 1 characterized in that the amount of component (b) is chosen such that the blend of components (a), (b), and (c) has an acid number of at least 80 mgm. KOH/gm.

5. Process according to claim 1 wherein the alpha-beta ethylenically unsaturated carboxylic acid includes acrylic acid.

6. Process according to claim 1 wherein the alpha-beta ethylenically unsaturated carboxylic acid includes (meth) acrylic acid.

References Cited

UNITED STATES PATENTS

| 3,365,414 | 1/1968 | Fisk et al. | 260—856 |
| 3,396,209 | 8/1968 | Sekmakas et al. | 260—856 |
| 3,018,265 | 1/1962 | Tessmar | 260—856 |
| 3,429,857 | 2/1969 | Layman | 260—856 |
| 3,450,660 | 6/1969 | Sekmakas | 260—856 |
| 3,499,849 | 3/1970 | Sekmakas et al. | 260—856 |
| 3,539,661 | 11/1970 | Rauch-Puntigam | 260—856 |

JOHN C. BLEUTGE, Primary Examiner

U.S. Cl. X.R.

117—132 A, 132 BF, 161 LN; 204—181; 260—29.4 UA, 39 R, 67.6 R, 71, 856